United States Patent
Ramalingam et al.

(10) Patent No.: US 9,001,977 B1
(45) Date of Patent: Apr. 7, 2015

(54) TELEPHONE-BASED USER AUTHENTICATION

(71) Applicant: Amazon Technologies, Inc., Reno, NV (US)

(72) Inventors: Harsha Ramalingam, Kirkland, WA (US); Jesper M. Johansson, Redmond, WA (US); Bhavnish H. Lathia, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 36 days.

(21) Appl. No.: 13/682,596

(22) Filed: Nov. 20, 2012

(51) Int. Cl.
  *H04M 1/64* (2006.01)
  *H04M 3/38* (2006.01)

(52) U.S. Cl.
  CPC ..................................... *H04M 3/385* (2013.01)

(58) Field of Classification Search
  CPC .. H04M 2201/40; H04M 3/382; H04M 3/385
  USPC ........... 379/88.02, 265.02; 704/247; 726/1, 6; 709/229
  See application file for complete search history.

(56) References Cited

U.S. PATENT DOCUMENTS

| | | | |
|---|---|---|---|
| 2006/0277043 A1* | 12/2006 | Tomes et al. | 704/247 |
| 2008/0205624 A1* | 8/2008 | Mandalia et al. | 379/265.02 |
| 2010/0132019 A1* | 5/2010 | Hardt | 726/6 |
| 2010/0262703 A1* | 10/2010 | Faynberg et al. | 709/229 |
| 2012/0260322 A1* | 10/2012 | Logan et al. | 726/6 |
| 2013/0205360 A1* | 8/2013 | Novak et al. | 726/1 |

* cited by examiner

*Primary Examiner* — Fan Tsang
*Assistant Examiner* — Van D Huynh
(74) *Attorney, Agent, or Firm* — Lee & Hayes, PLLC (57) ABSTRACT

This disclosure is directed to, in part, providing information about a user to a requesting party where the information is provided by an identity provider that has a preexisting relationship with the user. The user may request the identity provider to provide the information to the relying party using an interactive voice response (IVR) system. After the relying party requests the user's account information, the user may be redirected, at least momentarily, to an IVR system provided by the identity provider. The IVR system may authenticate the user. Once authenticated, the identity provider may provide the user information to the relying party. By authenticating the user, the identity provider may provide the user information to the relying party without compromising user credentials or other private or sensitive information of the user.

21 Claims, 6 Drawing Sheets

TELEPHONE-BASED USER AUTHENTICATION

BACKGROUND

Interactive voice response (IVR) systems allow entities to interact with users, such as customers that call the entity, without using human operators. IVR systems may be used to collect preliminary information, such as account numbers, menu selections, and/or other information. The IVR systems may also dispense information based on inputs from the user. For example, an IVR system may provide a user with information about a bank account, such a balance, recent transactions details, and/or other information. Entities and users are able to perform many functions using IVR systems such as conduct banking functions, purchase goods and services, and perform other functions. This evolution has been fueled in part by improved voice recognition capabilities of the IVR systems.

Some entities may host their own IVR system while others may use a third party to provide some or all of the IVR system for the entity. Regardless of a configuration, the IVR systems (or other complementary systems) are typically isolated from one another for various reasons, one of which is an inherent competition between the various entities. Another reason is to increase security and privacy of users. Yet another reason is a difficulty in sharing information between entities when each entity has a unique system (e.g., legacy system, etc.) that is inflexible and cannot easily share information.

During user interactions with an entity using an IVR system and/or at an electronic site, the entity may be able to collect significant amounts of information from the user that may include preferences of the user, payment information, address information, and other user information. However, this information is often constrained to user interactions with the respective IVR system and/or electronic site.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to, in part, providing information about a user to a requesting party where the information is provided by an identity provider that has a preexisting relationship with the user. The user may request the identity provider to provide the information to the relying party using an interactive voice response (IVR) system. In some embodiments, the identity provider may provide an electronic marketplace that allows users to perform one or more tasks such as view items, select items for consumption, and/or conduct payment transactions. The items may include goods, services, or both.

In accordance with various embodiments, the user may interact with the relying party using the IVR system or by talking to a human operator or representative. After the relying party requests information about the user, such as confirmation of an identity of the user, payment information and/or other information associated with the user and stored by the identity provider, the user may be redirected, at least momentarily, to an IVR system provided by the identity provider. The IVR system provided by the identity provider may authenticate the user. Once authenticated, the identity provider may provide the information about the user to the relying party. In some embodiments, the identity provider may also provide authentication to the user to prove to the user that the identity provider is authentic. In various embodiments, the relying party may authenticate with the identity provider to prove to the identity provider that the relying party is authentic. The identity provider may provide the information about the user to the relying party without compromising user credentials or other private or sensitive information of the user.

An authentication process may include providing credentials (e.g., username, password, etc.), responding to challenge questions, providing privileged data otherwise unknown to others (e.g., most recent transaction data, user preference, etc.), and other techniques that establish a positive identification of one party (e.g., the user, the identity provider, and/or the relying party) to another party.

The identity provider may enable the user to designate information associated with the user to be made available to the relying party and/or may establish other restrictions to limit access to the information (e.g. expiration times, restricted portions of data, etc.) when the relying party pulls the information from the identity provider. In various embodiments, the identity provider and/or the user may provide the relying party with a token that allows the relying party to gain at least temporary access to at least a portion of the user account.

As an example, a user may call the requesting party to conduct a transaction (e.g., purchase goods/service, subscribe to a service, etc.). The requesting party may desire to verify an identity of the user since the requesting party may not have previously interacted with the user. However, the requesting party may verify the user each time the user calls the requesting party. The requesting party may temporarily redirect the user to interact with the identity provider, who may store information about the user. The user may authenticate with the identity provider since the user knows private information that is shared with the identify provider (e.g., password, account information, etc.). The identify provider may then provide information about the user to the relying party. For example, the identity provider may provide information such as "This is Jon Doe residing at 123 Main St" and/or other information that identifies the user and/or provides information associated with the user (e.g., payment information, contact information, transaction history, credit ratings, etc.). The relying party may then continue interacting with the user after receiving the information about the user from the identity provider.

The techniques and systems described herein may be implemented in a number of ways. Example implementations are provided below with reference to the following figures.

Illustrative Environment

Figure 1:
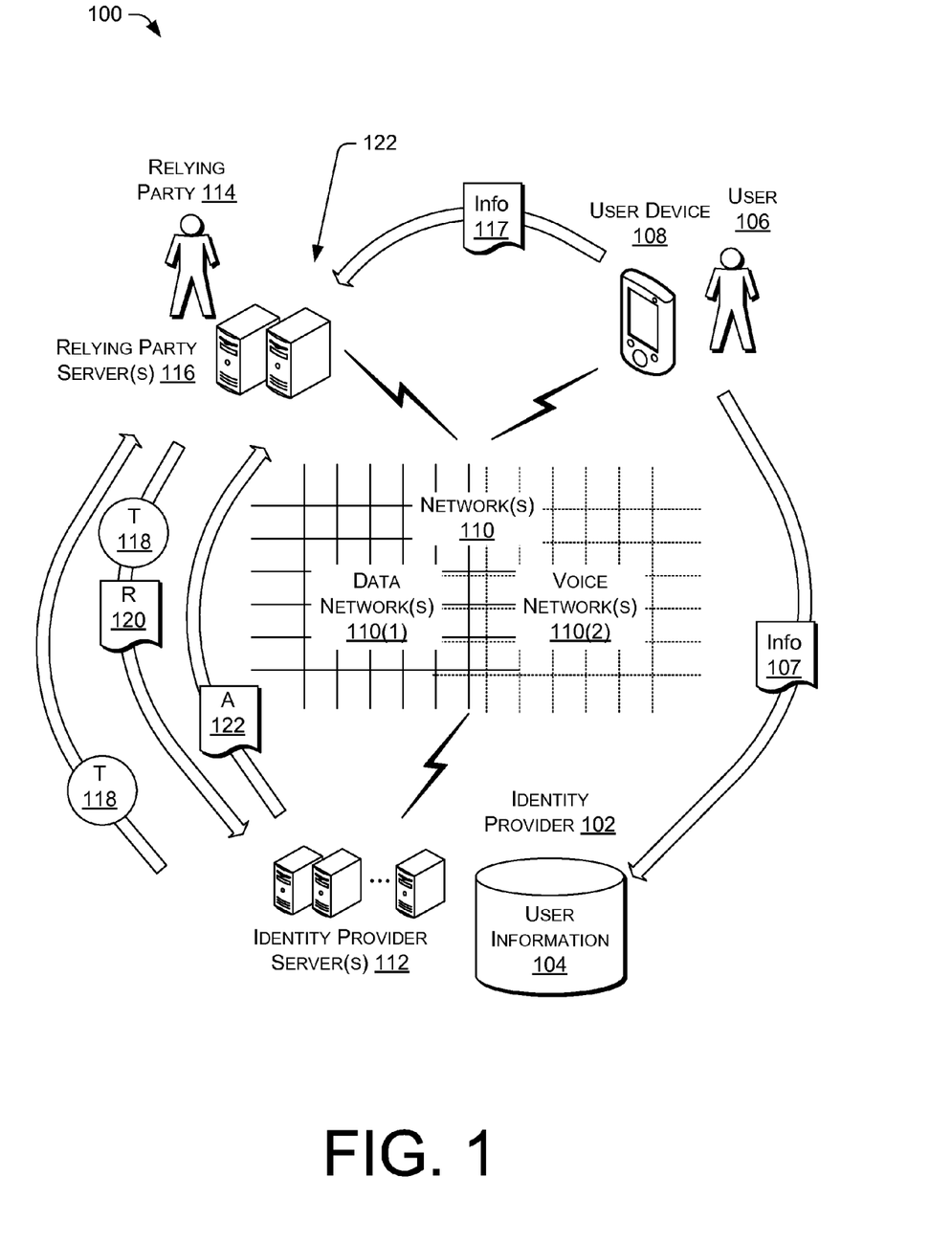
FIG. 1 is a schematic diagram of an illustrative environment usable to provide telephone-based user authentication.

FIG. 1 is a schematic diagram of an illustrative environment 100 usable to-provide telephone-based user authentication. The environment 100 may include an identity provider 102 that stores user information 104 associated with a user 106. The user information 104 may include information 107 collected by the identity provider through direct or indirect interaction with the user 106. At least some of the user information 104 may be private information that is shared between the identity provider 102 and the user 106. For example, the user information 104 may contain as little as an identifier of the user 106 and a shared secret (e.g., credentials, etc.).

In some embodiments, the user information 104 may include information stored in one or more accounts, which may provide the user 106 with access to credit card information, bank account information (e.g., checking account(s), savings account(s), investment account(s), etc.), stored value cards, gift cards, or other types of payment instruments associated with the user 106. The user 106 may make payments with his or her account(s). The user information 104 may also include shipping address information, contacts, transaction history, user preferences, and/or other information associated with the user.

The identity provider 102, meanwhile, may process transactions with the user 106 such as when the user purchases an item from the identity provider 102. In some embodiments, the identity provider 102 may provide an electronic marketplace that allows the user to perform one or more tasks such as view items, select items for consumption, and/or conduct transactions. The items may include goods, services, or both. Thus, through direct or indirect interactions with the identity provider 102, the user 106 may populate the user information 104 to include transaction data, browsing data, and/or other data based at least in part on user interaction with the identity provider.

The user 106 may access the user information 104 using a user device 108. The user device 108 may be a mobile telephone, a smart phone, a tablet computer, a laptop computer, a netbook, a personal digital assistance (PDA), a gaming device, a media player, or any other mobile computing device that includes a display and can connect to a network(s) 110 to exchange information with identity provider servers 112 of the identity provider 102. In some embodiments, the user 106 may interact with an interactive voice response (IVR) system employed by the identity provider 102, which may enable the user 102 to access and/or modify the user information 104.

The network(s) 110 may include wired and/or wireless networks that enable communications between the various computing devices described in the environment 100. The network(s) 110 may include data network(s) 110(1) (e.g., local area networks (LANs), wide area networks (WAN), etc.) and/or voice network(s) 110(2) (e.g., mobile telephone networks (MTNs), etc.). The various types of network(s) 110 may be used in conjunction with one another, to facilitate communication between the various computing devices (i.e., the user device 108, the identity provider servers 112, and/or relying party servers 116. The identity provider servers 112 and the relying party servers 116 are described in greater detail with reference to FIGS. 2A and 2B.

In accordance with one or more embodiments, the user 106 may interact with a relying party 114. For example, the user 106 may interact with an IVR system employed by the relying party servers 116 or with a human representative employed by the relying party 114. The user 106 may provide information 117 to the relying party 114 during the interaction. During the interaction with the relying party 114, the user 106 may desire to provide the relying party 114 identification information and/or other information of the user information 104, such as payment information, shipping addresses, personal data, or other information. In some instances, the relying party 114 may request at least a portion of the user information 104 (e.g., push information) or otherwise provide the user 106 with an option to provide the relying party 114 with access to the user information 104 (e.g., pull information).

In various embodiments, the relying party 114 may reroute, redirect, or otherwise connect the user 106 to the identity provider 102 during an interaction between the relying party 114 and the user 106. By connecting the user 106 to the identity provider 102, the user 106 may provide authentication information to the identity provider 102 to gain access to the user information 104 and then provide the identity provider 102 with a permission to at least temporarily provide (or make available) the user information (or a portion thereof) to the relying party 114. The authentication process may include the user 106 providing user credentials (e.g., username, password, etc.), responding to challenge questions, providing privileged data otherwise unknown to others (e.g., most recent transaction data, user preference, etc.), and other techniques that establish a positive identification of one party (e.g., the user, the identity provider, and/or the relying party) to another party. In some embodiments, additional authentications may be performed to establish positive identification between the identity provider 102 and the user 106 and between the identity provider 102 and the relying party 114.

After authentication has successfully been preformed, the identity provider 102 may provide at least a portion of the user information 104 to the relying party 114 and/or make at least a portion of the user information 104 available for access by the relying party 114. The providing or access may be restricted in quantity, duration, and/or otherwise subject to restrictions imposed by the identity provider 102 and/or the user 106 via selected preferences. In accordance with some embodiments, the providing or access may be facilitated by passing a token 118 from the identity provider servers 112 to the relying party servers 116. The token 118 may include an identification of the user information 104 and may be associated with any restrictions imposed on use of the user information. In some embodiments, the token 118 may include the data requested by the relying party 114.

When the token 118 provides the relying party 114 with access to the user information 104, the relying party servers 116 may submit the token 118 with a request 120 for information about the user 106 and/or information associated with the user 106. After the identity provider servers 112 verify the token 118 and ensure that the request 120 complies with any restrictions imposed on the token (e.g., redemption within a required time limit, request for allowed data, etc.), the identity provider servers 112 may transmit an answer 122 to the relying party that includes the requested data.

Meanwhile, after the authentication is successfully performed, the relying party 114 and the user 106 may resume communications. For example, the identity provider 102 may handoff the user 106 back to an IVR system used by the relying party servers 116 to gather data and/or perform services for the user 106. Thus, the environment 110 may enable the user 106 to interact with the relying party 114 during a telephone-based call. During the call, the user 102 may be temporarily transferred to the identity provider 102, whereby the identity provider 102 may authenticate the user 106 to ensure a true identity of the user 106. After the identity provider 102 authenticates the user 106, the identity provider may transfer the user back to the relying party 114 to resume the voice based call and may also provide at least some of the user information to the relying party 114 without the relying party obtaining user credentials and/or permanent access (or unrestricted access) to the user account 104.

Figure 2A:
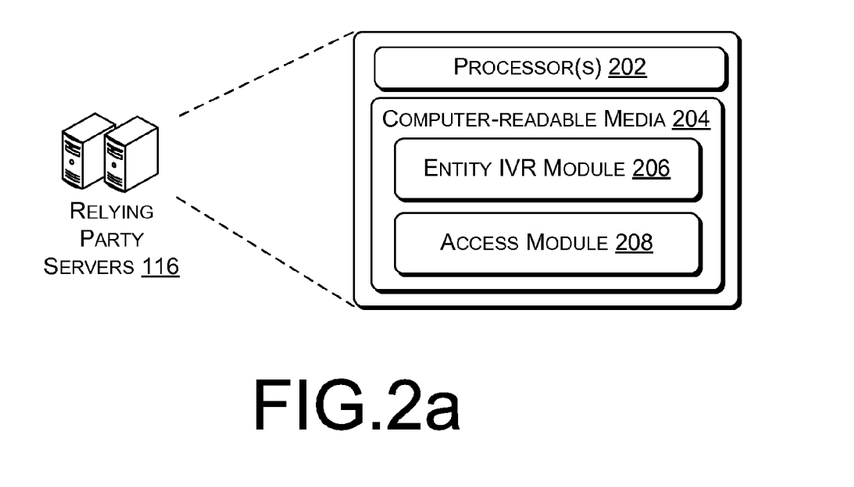
FIGS. 2A and 2B are block diagrams of illustrative computing architecture of various devices included in the environment of FIG. 1.
Figure 2B:
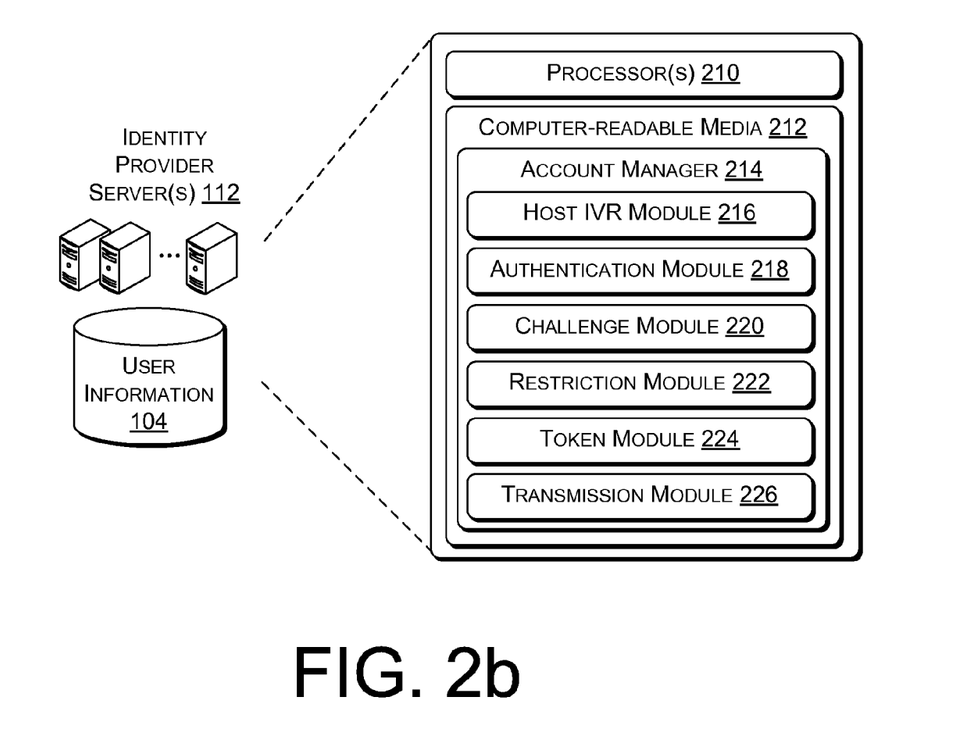

FIGS. 2A and 2B are block diagrams of illustrative computing architecture of various devices included in the environment 100 shown in FIG. 1.

FIG. 2A shows an illustrative computing architecture of the relying party servers 116. The architecture may include processors(s) 202 and computer-readable media 204. The computer-readable media 204 may store various modules, applications, programs, or other data. The computer-readable media 204 may include instructions that, when executed by the processor(s) 202, cause the processors to perform the operations described herein for the relying party servers 116. In some embodiments, the computer-readable media 204 may store a relying party IVR module 206 that may provide an IVR service to the user 106. The computer-readable media 204 may store an access module 208 that may handoff the user 106 to the identity provider 102 (as described above), receive the token 118, and/or access the user information 104 after authentication between the user 106 and the identity provider 102.

FIG. 2B shows illustrative computing architecture of the identity provider servers 112. The architecture may include processors(s) 210 and computer-readable media 212. The computer-readable media 212 may store various modules, applications, programs, or other data. The computer-readable media 212 may include instructions that, when executed by the processor(s) 210, cause the processors to perform the operations described herein for the identity provider servers 112. In some embodiments, the computer-readable media 212 may store an account manager 214 that facilitates interaction with the user 106 and with the relying party 114 to provide the user information 104 to the relying party 114. The account manager 214 may further include an identity provider IVR module 216, an authentication module 218, a challenge module 220, a restriction module 222, a token module 224, and a transmission module 224. Each module is discussed in turn.

The identity provider IVR module 216 may provide an IVR service to the user 106 to enable the user 106 to interact with the identity provider 102 during an authentication process (performed in part by the authentication module 218) and/or to select restrictions for use of the user information 104 (performed in part by the restriction module 220).

The authentication module 218 may be used to authenticate the user 106, the relying party 114, and/or the identity provider 102 (to prove the identity provider's identity to the user 106). The authentication module 218 may authenticate the user 106 by requiring the user to provide credentials, respond to challenge questions (performed in part by the challenge module 224), and/or provide privileged data otherwise unknown to others. The authentication module 218 may authenticate the relying party 114 by receiving pre-established credentials. The authentication module 218 may authenticate the identity provider 102 by providing the user 106 with facts about the user information 104 that verify the identity provider's access to the user information 104. For example, the identity provider may provide information such as a day and amount of a last transaction between the user and the identity provider.

In some embodiments, the authentication module 218 may accept voice input and/or data input (e.g., input from a touchpad of a telephone, computer, etc.). When the input from the user is from a telephone touchpad using a T9-type system (nine keys representing the characters of the English alphabet), the authentication module 218 may accept an input such as ""Stewart street" as a T9 input of "7839278 787338" or "7839278 78". The authentication module may then compare the T9 input by the user to a converted input of the expected answer to make sure the input matches the answer. In some instances, there may be multiple acceptable answers that vary based on spacing, configurations of keypads, and so forth.

The challenge module 220 may generate challenge questions that may be used to authenticate the user 106. For example, the challenge module 220 may retrieve facts about the user's recent transaction history with the identity provider and assemble a short quiz. Examples of challenge questions include without limitation portions of a user's address, portions of a user's payment account number, an email address, a date of a recent order, and so forth. By using challenge questions, the user 106 may be able to perform a unique, one-time authentication process that may answer random questions to enable the user to prove the user's identity to the identity provider. The answers to the questions may not compromise access to the user information when the identity provider 102 maintains a large pool of challenge questions and only a portion of the questions are used per authentication. Thus, when a user responds to challenge questions by answering the questions verbally, other people nearby (eavesdroppers) that overhear the user will be unable to access the user information 104 because the same challenge questions will not be used during a next authentication.

The restriction module 222 may enable the user to set restrictions of use, access, or other types of restrictions for the user information 104. For example, the user 106 may select or designate which portions of the user information 104 are to be provided or made accessible to the relying party 114 (e.g., payment data, shipping addresses, transaction history, specific files, etc.). The user 106 may also select an expiration or other access limitations for the user information 104 when the identity provider 102 provides the relying party 114 with the token 118 to access the user information 104.

The token module 224 may generate the token 118 and transmit the token 118 to the relying party 114 when the authentication processes are completed and valid. In some embodiments, the token 118 may enable access to the user information 104 by the relying party servers 116 by a request for data (pull operation). The token 118 may include an identification of the user information, which may only be readable by the identity provider servers 112. The token module 224 may also validate the token 118 when the token is redeemed by the relying party 114. In various embodiments, the token module 224 may store at least some of the user information in the token 118 and encrypt the token. The relying party may then receive the user information (or portion thereof) after decrypting the token 118. In some instances, the token module 224 may pass the token to the relying party 114 (or possibly to the user 106) using a caller identification (ID) feature. For example, when the identity provider connects back to the relying party, the identity provider may provide the token via a caller ID message linked to the call by the identity provider 102.

The transmission module 226 may provide the token 118 to the relying party 114 and/or provide at least a portion of the user information 104 to the relying party servers 116, possibly in response to redemption of the token 118 by the relying party 114 or following the authentication of the user 106.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by Internet download. Thus, the computer-readable media used by the user device 108, the agent device 120, and/or the identity provider servers 112 may be implemented at the computer program product as described above.

Illustrative Operations

Figure 3:
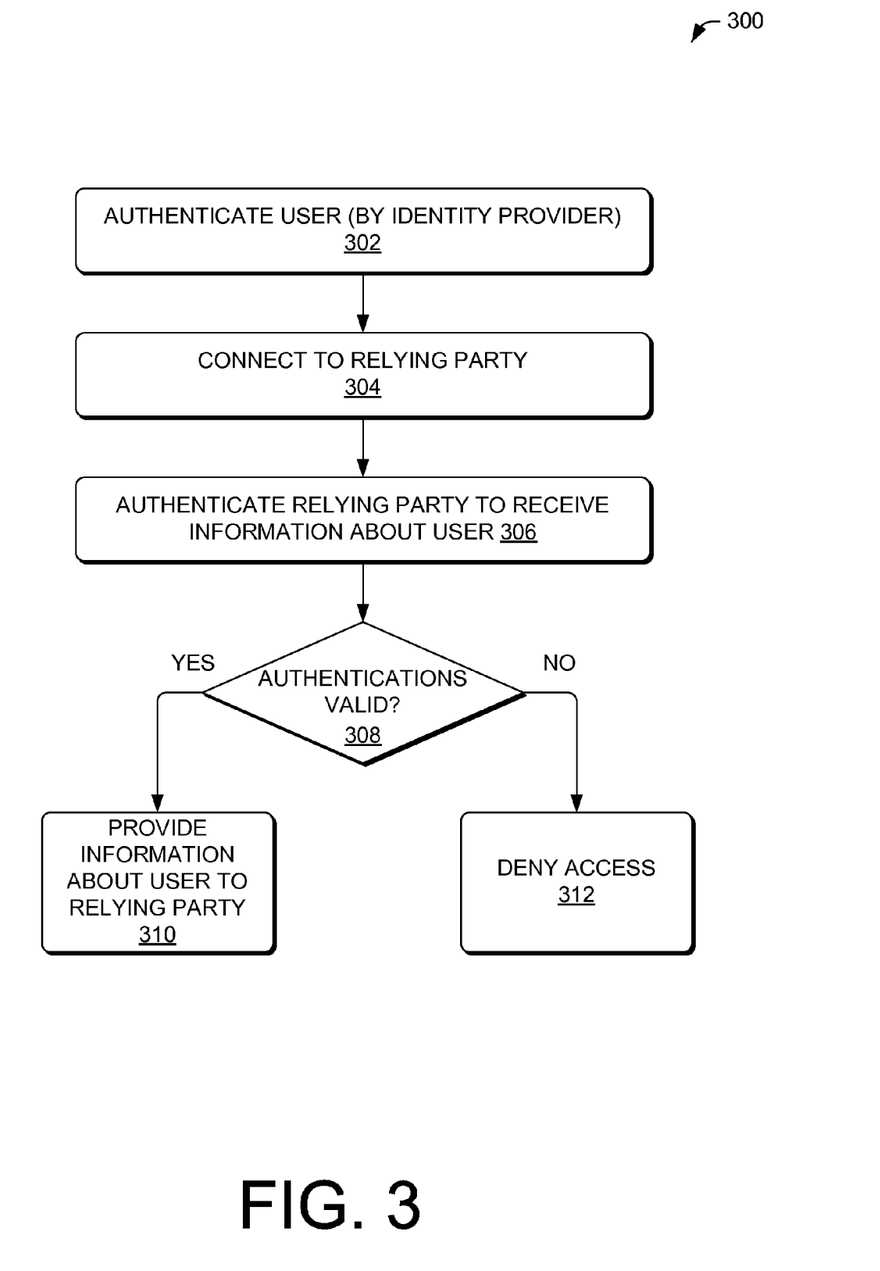
FIG. 3 is a flow diagram of an illustrative process to perform telephone-based user authentication to allow a relying party to obtain information about a user provided by an identity provider.
Figure 4:
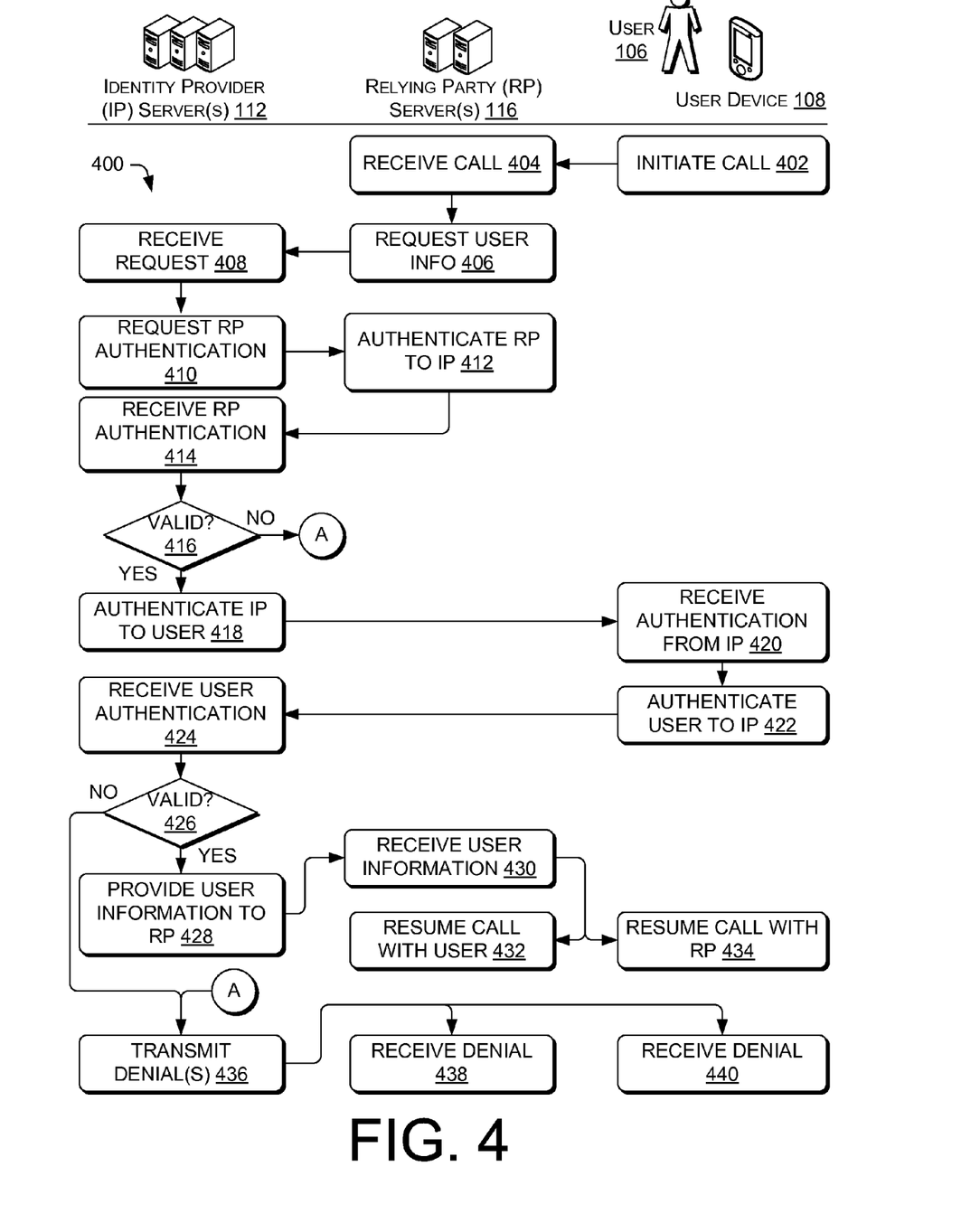
FIG. 4 is a flow diagram of another illustrative process to perform telephone-based user authentication.
Figure 5:
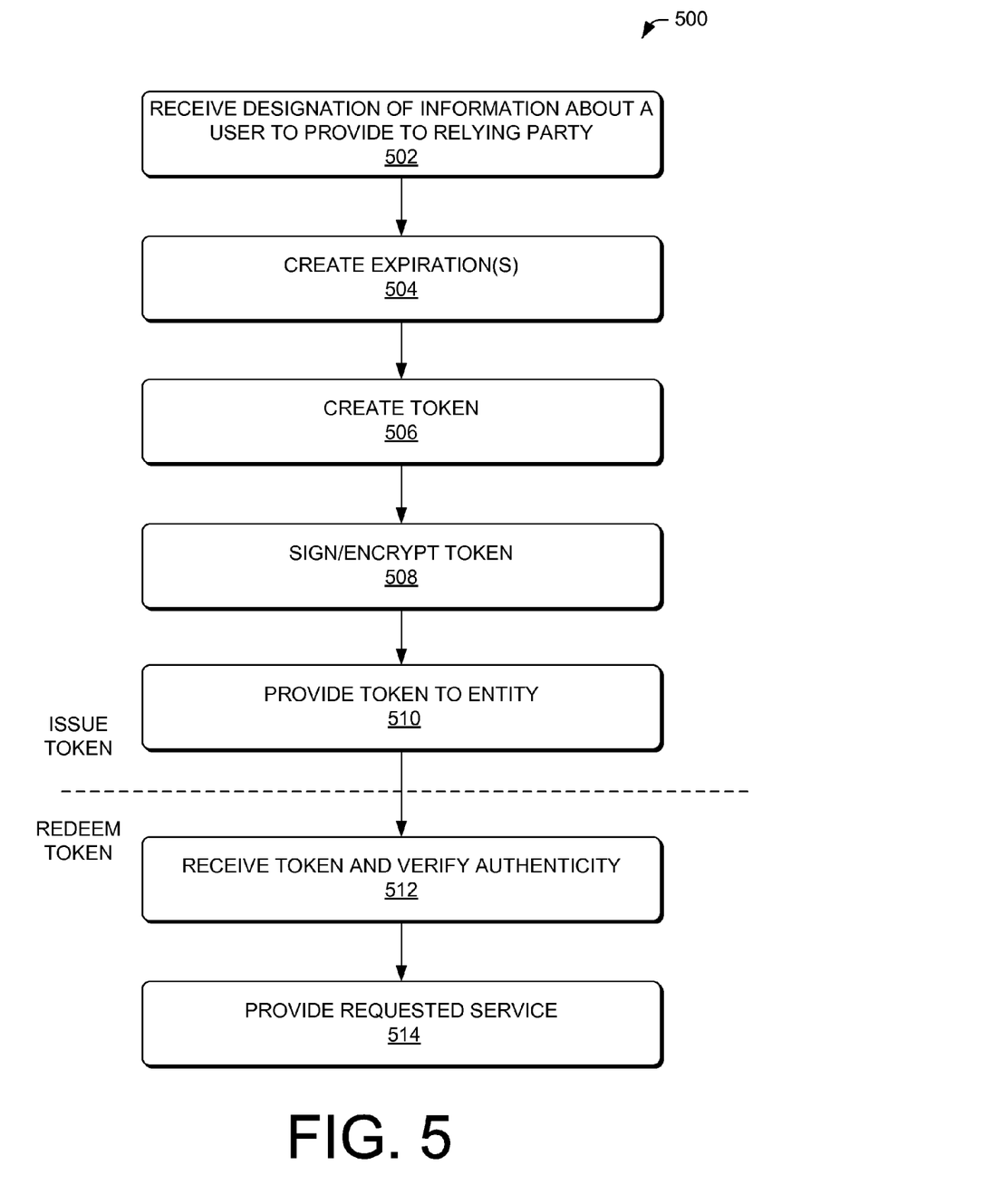
FIG. 5 is a flow diagram of an illustrative process to create a token that provides access to information about a user.

FIGS. 3-5 show various processes to provide telephone-based user authentications. The processes are illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to perform telephone-based user authentication to allow a relying party to obtain information about a user provided by an identity provider. The process 300 is described with reference to the environment 100 and may be performed by the identity provider servers 112. Of course, the process 300 may be performed in other similar and/or different environments. The process 300 may include a handoff of the user 106 by the relying party 114 to the identity provider 102 or may include a communication originated between the user 106 and the identity provider 102.

At 302, the authentication module 218 may authenticate the user 106 to allow the user 106 to access the user information 104 and/or provide access to the user information 104 by the relying party 114. In some embodiments, the identity provider servers 112 may communicate with the user 106 using the identity provider IVR module 216.

At 304, the identity provider servers 112 may connect with the relying party servers 116. For example, the identify provider servers 112 may connect to the relying party servers 116 using an automated protocol, such as by using the identity provider IVR module 216. In some embodiments, the identity provider servers 112 may connect with the relying party servers 116 while the user is interacting with the identity provider IVR module 206.

AT 306, the authentication module 218 may authenticate the relying party 114 to allow the relying party servers 116 to access the user information 104 and/or before providing the user information 104 to the relying party servers 116. The authentication of the relying party 114 may include receipt of credentials from the relying party 114. In some embodiments, the authentication module 218 may communicate electronically with the relying party servers 116 to process the authentication.

At 308, the authentication module 218 may determine whether the authentications are valid. When the authentications are valid and correct identities are confirmed (following the "yes" route from the decision block 308), then the transmission module 226 may provide requested information about the user and/or information associated with the user to the relying party 114 at 310. However, when either of the authentications is not valid (following the "no" route from the decision block 308), then the transmission module 226 may deny access at 312 to the user information 104 by the relying party 114.

FIG. 4 is a flow diagram of another illustrative process 400 to perform telephone-based user authentication. The process 400 shows operations organized under devices that may perform the operations. However, the operations may be performed by other devices.

At 402, the user 106 may initiate a telephone call communication with the relying party 114. For example, the user 106 may dial a customer service telephone number associated with the relying party 114 or may connect to the relying party 114 using a voice-over Internet protocol (VoIP) service, which may be initiated from a site hosted by the relying party servers 116. For example, the user 106 may select a link from a webpage hosted by the relying party 114.

At 404, the relying party servers 116 may receive the communication using the relying party IVR module 206 or possibly using a human representative. At 406, possibly after exchanging information with the user (via the IVR system and/or a human representative), the relying party 114 may request the user 106 to provide at least some of the user information 104. The relying party 114 may cause a handoff or transfer of the user 106 to the identity provider 102 to provide the user information 104.

At 408, the identity provider 102 may receive the request from the relying party 114 and/or connect with the user 106 via the handoff or transfer.

At 410, the authentication module 218 may authenticate with the relying party 114. The authentication with the relying party may occur before, during, or after the authentication with the user 106. The authentication with the relying party 114 may be by passage of credentials, a token, and/or other data that proves an identity of the relying party 114. Thus, the authentication with the relying party 114 may be performed using the same or different authentication techniques and/or communications as the authentication with the user 106.

At 412 the relying party 114 may receive the authentication request and provide an authentication response to the identity provider 102. At 414, the identity provider 102 may receive the authentication response from the relying party 114. The operations 410-414 may be implemented as a white list operation (or a black list operation) that indicates allowed (or denied) parties. In some instances, the authentication of the operations 410-414 may be performed by code embedded in a protocol used to exchange data between the relying party servers 116 and the identity provider servers 112.

At 416, the authentication module 218 may determine whether the relying party 114 is authenticated (valid). When the relying party 114 is authenticated and valid (following the "yes" route from the decision operation 416), then the process 400 may advance to an operation 418 for further processing.

At 418, the authentication module 218 may prompt the user 106 for authentication information. For example the authentication module 218 may initially reveal privileged information (yet unimportant information) to the user to prove an identity of the identity provider 102. The privileged information may be information about a recent transaction involving the identity provider and the user 106 or other unimportant information that proves the identity of the identity provider 102 to the user 106. The identity provider 102 may also provide a request for the user 106 to input credentials, answer challenge questions, or perform other tasks to verify an identity of the user 106 back to the identity provider 102. In some instances, the identity provider servers 112 may transmit call back, text message, or other communication to the user to perform the authentication.

At 420, the user 106 may receive the authentication from the identity provider 102, such as the privileged information that proves the identity of the identity provider. The user may also receive the prompt to authenticate the user to the identity provider.

At 422, the user 106 may provide authentication information to the identity provider 102, such as credentials, answers to challenge questions, and/or other information.

At 424, the authentication module 218 may receive the response from the user 106. The authentication module 218 may use the information to determine whether the user is authenticated, whether to ask additional questions, or whether to take other action to for authentication purposes. The interactions between the identity provider 102 and the user 106 may be repeated (e.g., multiple challenge questions, etc.), and thus the operations 422 and 424 may be repeated.

At 426, the authentication module 218 may determine whether the user is authenticated (valid). When the user is authenticated and valid (following the "yes" route from the decision operation 426), then the process 400 may advance to an operation 428.

At 428, the identity provider 102 may provide the user information 104 (or a portion thereof) to the relying party 114. In some embodiments, as discussed with reference to FIG. 5, the identity provider servers 112 may create a token that allows the relying party 114 to request the user information when the user information is needed.

At 430, the relying party servers 116 may receive the user information 104 (or portion thereof).

At 432 and at 434, the user 106 and the relying party 114 may resume communication and interaction with each other. For example, the identity provider 102 may handoff or transfer the user 106 back to the relying party 114 so that the user can resume interaction with the relying party IVR module 206 or resume interaction with a human representative of the relying party 114.

When the authentication fails (not valid) (following the "no" route from the decision operation 416 or 426), then the process 400 may advance to an operation 436 for further processing. At 436, the identity provider may transmit one or more denials that indicate that access to the user information 104 is not authorized. The denials may be received by the relying party 114 at 438 and/or the user 106 at 440. In some instances, following the denial, the user and the relying party may be connected to enable resuming the communication and interaction at the operations 432 and 434.

FIG. 5 is a flow diagram of an illustrative process 500 to create a token that provides access to information about a user. The process 500 is described with reference to the environment 100 and may be performed by the identity provider servers 112. Of course, the process 500 may be performed in other similar and/or different environments. The process 500 may occur after the authentication module 218 receives the user authentication information.

At 502, the restriction module 222 may receive designations of the user information 104 that are made accessible to the relying party 114. The restriction module 222 may perform the designations by a question/response process involving the user 106 using the identity provider IVR module 216. The restriction module 222 may include default and/or custom profiles and/or settings to enable the user 106 to quickly select designations. For example, one designation may be provided by a verbal command of "allow all payment types" issued by the user 106, which may cause the restriction module 222 to allow the relying party 114 to access all of the payment types in the user information 104. In another example, a designation may be to provide basic identification information (e.g., This is Jon Doe at 123 Main St., etc.). In some instances, the designation may be performed based on a requested data by the relying party 114. For example, the relying party 114 may request shipping addresses or other specific portions of the user information 104. The restriction module 222 may indicate the requested data to the user 106 and ask for approval. Of course, these are merely examples of many ways to designate the portions of the user information 104 that is made available to the relying party 114.

At 504, the restriction module 222 may receive one or more expirations of the availability of the user information 104. The expiration(s) may be based on a time limit, an access quantity limit, and/or other limits. The user 106 may select the expiration(s) by interacting with the identity provider IVR module 216.

At 506, the token module 224 may create the token 118 for delivery to the relying party 114. The token 118 may allow the relying party 114 to access the user information 104 in accordance with the restrictions and/or expirations determined at the operations 502 and 504. The restrictions and/or expirations may be included in the token 118 and/or stored by the identity provider 102 and verified during redemption of the token 118.

At 508, the token module 224 may sign the token 118 and/or encrypt the token 118. For example, the token module 224 may sign the token using a signature that may allow passage of the token to other entities (including the relying party 114) while ensuring the authenticity and/or origin of the token. When the token includes the user information, then the token 118 may be encrypted to prevent unauthorized access to the user information in a situation where the token is intercepted or otherwise obtained by an unauthorized party.

At 510, the transmission module 226 may provide the token to the relying party servers 116. In some embodiments, the relying party may then have the requested user information (when the token contains the user information), and therefore may not need to conduct further exchanges with the identity provider servers 112. However, when the relying party 114 with access to the user information through another request to the identify provider servers 112 (e.g., via a pull operation), then the process 500 may continue with operations 512 and 514 described below.

At 512, the token module 224 may receive a request for account information from the relying party servers 116. When the request complies with the restrictions created at the operation 502 and the expiration(s) created at the operation 504, the transmission module 226 may provide the requested user information to the relying party at 514.

Illustrative Application Program Interfaces (APIs)

Figure 6:
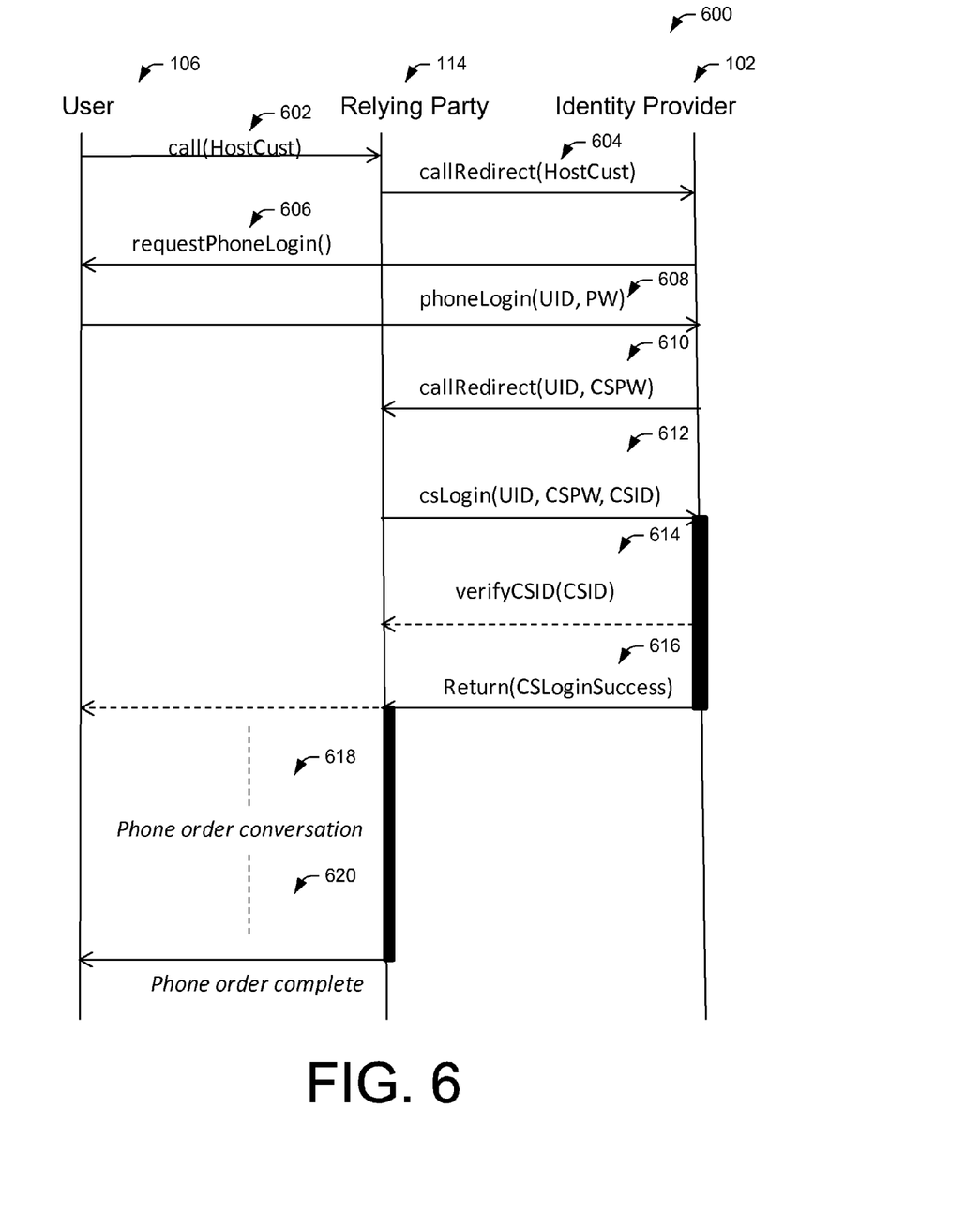
FIG. 6 is a schematic of illustrative application program interfaces (APIs) that may be used to facilitate telephone-based user authentications.

FIG. 6 is a schematic of illustrative application program interfaces (APIs) 600 that may be used to facilitate telephone-based user authentications. The APIs 600 are organized under communications between each of the user 106, the relying party 114, and the identity provider 102. The APIs 600 may be implemented by the relying party servers 116 and/or the identity provider servers 112, which may employ the relying party IVR module 206 and the identity provider IVR module 216, respectively. The illustrative APIs 600 depict a telephone order by the user 106 from the relying party 114; however, other tasks may be performed by the relying party 114 for the user 106 in addition to or instead of a telephone order.

A call(HostCust) API 602 may connect the user 106 to the relying party 114 via the relying party servers 116. For example, when the user 106 connects with the relying party 114 using a prompt provided by a page hosted by the relying party servers 116. The call API 602 may pass data (HostCust), which may indicate an identity provider that includes user information for the user 106.

A callRedirect(HostCust) API 604 may redirect the user 106 to the identity provider 102 to enable the user to authenticate with the identity provider and obtain access, for the relying party 114, of the user information 104 (or a portion thereof).

A requestPhoneLogin( ) API 606 may request the user 106 to input credentials such as a user identifier (UID) and a password (PW). However, other information may be provided such as responses to challenge questions, and so forth as described above.

A phoneLogin (UID, PW) API 608 may receive the response from the user 106, which may include the user identifier and password, response to challenge questions, and so forth.

A callRedirect(UID, CSPW) API 610 may redirect the call (or other type of communication to the relying party 114 so that the identity provider 102 can communicate and exchange information with the relying party 114.

A csLogin(UID, CSPW, CSID) API 612 may request the relying party 114 to input credentials such as a customer service identifier (CSID) and a customer service password (CSPW).

A verifyCSID(CSID) API 614 may verify the authentication by the relying party 114.

A return(CSLoginSuccess) API 616 may reconnect (handoff, transfer) the user 106 back to the relying party 114.

At 618, the user 106 and the relying party 114 may resume the phone order interactions or other types of interactions.

At 620, the phone order and/or other process(es) may be completed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving from a relying party server and by one or more computing devices, an indication to initiate a communication session with a user device;
establishing, by at least one of the one or more computing devices, an interactive voice response (IVR) session between an identity provider server and the user device;
providing, by at least one of the one or more computing devices, a prompt during the IVR session to request the user device to provide authentication information and access limitations to the identity provider server, wherein the access limitations indicate portions of the authentication information that are to be made accessible by the relying party server;
receiving, by at least one of the one or more computing devices and from the user device, a response to the prompt;
transmitting, by at least one of the one or more computing devices and to the relying party server, the portions of the authentication information that correspond to the access limitations associated with the user device; and
causing, by at least one of the one or more computing devices, the communication session between the user device and the relying party server to be established.

2. The method as recited in claim 1, further comprising providing privileged information from an identity provider associated with the identity provider server to the user device prior to the providing the prompt, the privileged information to verify an identity of the identity provider to the user device.

3. The method as recited in claim 1, wherein the providing the prompt includes providing at least one challenge question to a user associated with the user device to verify an identity of the user.

4. The method as recited in claim 1, wherein the prompt to request the access limitations further comprises:
providing the user device with a selection of restrictions that limit access by the relying party server to at least some portions of the authentication information; and
receiving a selection from the user device, via the IVR session, of one or more of the restrictions.

5. A method, comprising:
receiving, from a relying party server, a request to initiate a communication session with a user device;
transmitting an authentication request to the user device to provide user information and access limitations to an identity provider server, the access limitations indicating portions of the user information that are to be made accessible by the relying party server;
receiving a response from the user device in response to the authentication request;
providing to the relying party server the portions of the user information that correspond to the access limitations associated with the user device; and
causing the communication session between the user device and the relying party server to be established.

6. The method as recited in claim 5, wherein the access limitations include an expiration of an availability of the data to the relying party server.

7. The method as recited in claim 5, wherein the user information includes at least one payment type and at least one shipping address.

8. The method as recited in claim 5, wherein the transmitting the authentication request and the receiving the response from the user device is performed using an interactive voice response (IVR) session provided by an IVR system.

9. The method as recited in claim 8, wherein the authentication request includes a request for the user device to respond to challenge questions to verify an identity of a user associated with the user device.

10. The method as recited in claim 9, wherein the challenge questions are drawn from a bank of questions generated based at least in part on information in the user information associated with the user.

11. The method as recited in claim 8, wherein the authentication request includes a request for the user device to provide user credentials to verify an identity of a user associated with the user device.

12. The method as recited in claim 11, wherein the user credentials are a user name and password.

13. The method as recited in claim 8, wherein the response from the user device is received by a voice input during the IVR session with the identity provider server.

14. The method as recited in claim 5, wherein the response from the user device is received via inputs of a telephone keypad from the user device, and further comprising translating the inputs of the telephone keypad to determine the response.

15. The method as recited in claim 5, further comprising providing privileged information from the identity provider server to the user device prior to transmitting the authentication request, the privileged information to verify an identity of an identity provider associated with the identity provider server.

16. The method as recited in claim 5, further comprising, verifying an identity of a relying party associated with the relying party server prior to the providing to the relying party server, the portions of the user information that correspond to the access limitations associated with the user device.

17. One or more non-transitory computer-readable media storing computer-executable instructions that, when executed on one or more processors, performs acts comprising:
 initiating an interactive voice response (IVR) session with a user device;
 causing transmission of an authentication request, during the IVR session, to the user device to provide authentication information and access limitations to an identity provider server, wherein the access limitations indicate portions of the authentication information that are to be made accessible by a relying party server;
 receiving an audible response from the user device in response to the authentication request;
 transmitting the portions of the authentication information that correspond to the access limitations associated with the user device to the relying party server associated with the user device; and
 causing a communication session between the user device and the relying party server to be established.

18. The one or more non-transitory computer-readable media as recited in claim 17, wherein the acts further comprise creating a bank of challenge questions based on the authentication information, and wherein the authentication request includes a request for a user associated with the user device to respond to some of the challenge questions to verify an identity of the user.

19. The one or more non-transitory computer-readable media as recited in claim 17, wherein the audible response from the user device is received via inputs of a telephone keypad from the user device, and wherein the acts further comprise translating the inputs of the telephone keypad to determine the response.

20. The one or more non-transitory computer-readable media as recited in claim 17, wherein the authentication request includes a request for a user associated with the user device to provide user credentials to verify an identity of the user or ownership of the authentication information.

21. The method as recited in claim 1, wherein the transmitting further comprises, sending a token to the relying party server that corresponds to the portions of the authentication information and the access limitations associated with the user device.

* * * * *